Figure 4:
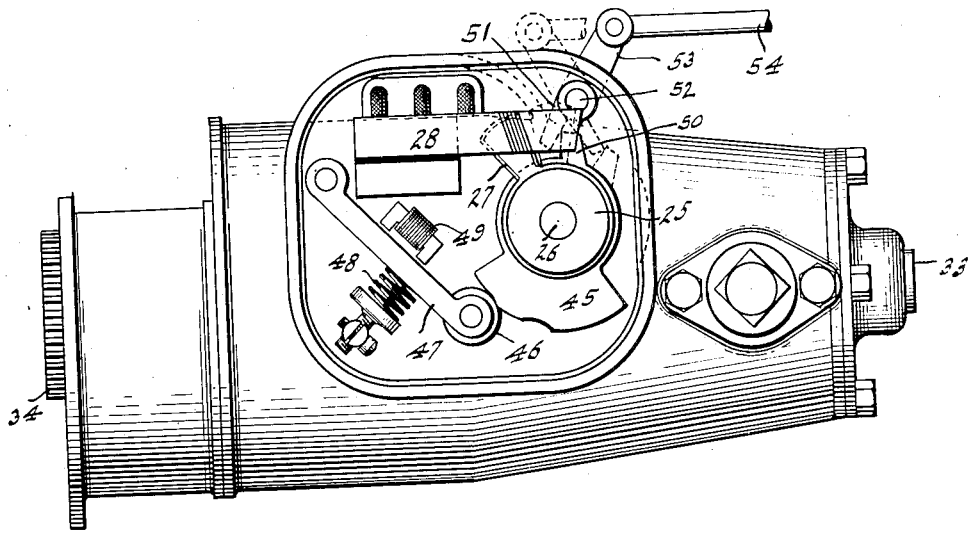

R. H. HASSLER.
CONTROLLER FOR SELF STARTERS FOR ENGINES.
APPLICATION FILED NOV. 23, 1912.
1,111,150.
Patented Sept. 22, 1914.
2 SHEETS—SHEET 1.
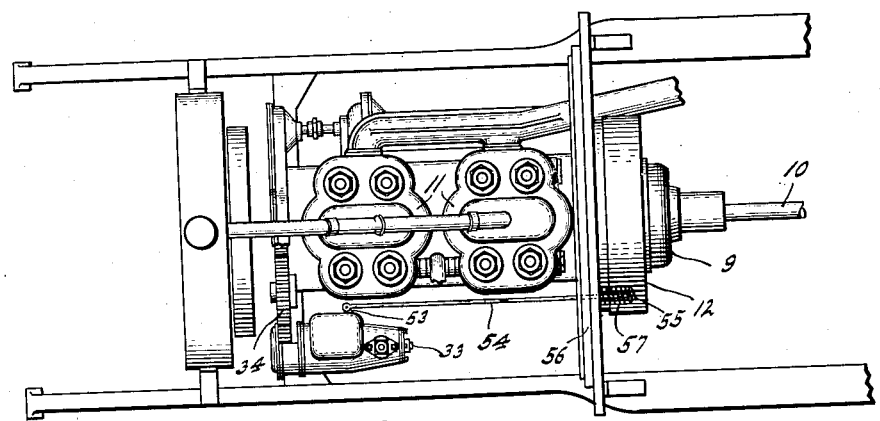
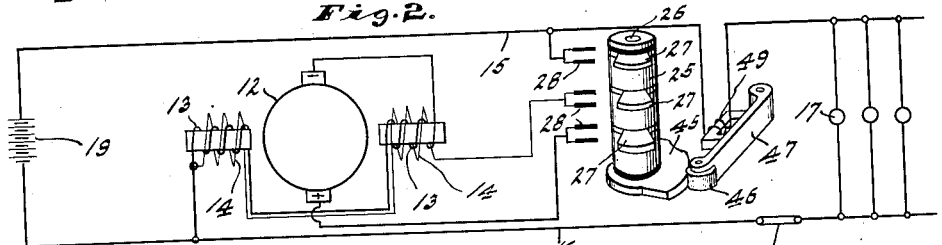
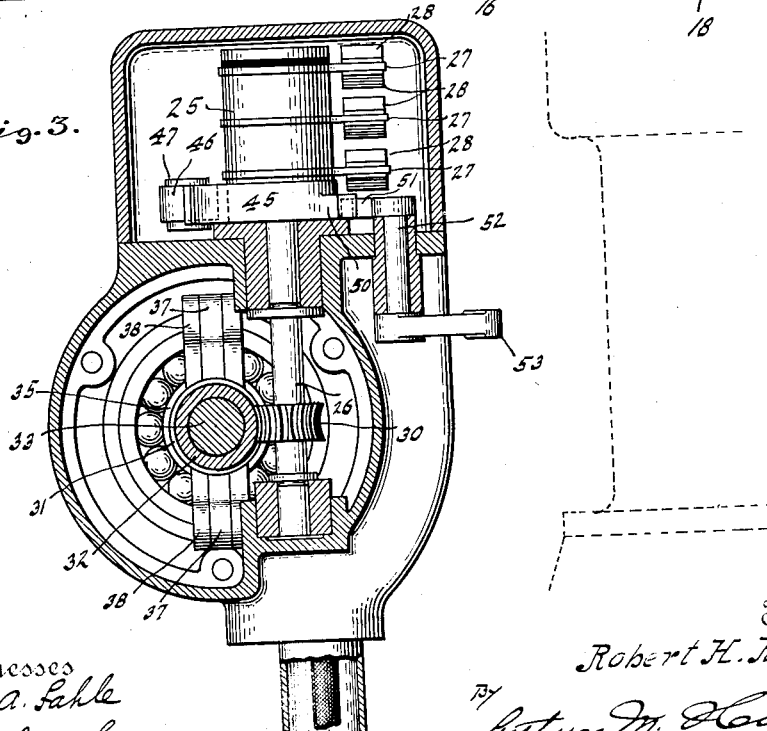
Witnesses
Frank A. Fahle
Josephine Casper
Inventor
Robert H. Hassler,
By Arthur M. Hood
Attorney R. H. HASSLER.
CONTROLLER FOR SELF STARTERS FOR ENGINES.
APPLICATION FILED NOV. 23, 1912.

1,111,150.

Patented Sept. 22, 1914.
2 SHEETS—SHEET 2.

Witnesses
Frank A. Fahle
Josephine Gasper

Inventor
Robert H. Hassler,
BY Arthur M. Hood
Attorney

UNITED STATES PATENT OFFICE.

ROBERT H. HASSLER, OF INDIANAPOLIS, INDIANA, ASSIGNOR TO NORDYKE & MARMON COMPANY, OF INDIANAPOLIS, INDIANA, A CORPORATION OF INDIANA.

CONTROLLER FOR SELF-STARTERS FOR ENGINES.

1,111,150.

Specification of Letters Patent. Patented Sept. 22, 1914.

Application filed November 23, 1912. Serial No. 733,055.

*To all whom it may concern:*

Be it known that I, ROBERT H. HASSLER, a citizen of the United States, residing at Indianapolis, in the county of Marion and State of Indiana, have invented a new and useful Controller for Self-Starters for Engines, of which the following is a specification.

In the operation of automobiles having an electric lighting system supplied from a storage battery which is charged by the generator action of a dynamo-electric machine driven by the same engine which drives the automobile, especially if the dynamo-electric machine is also arranged to act as an engine-starting motor energized by current from the battery, considerable difficulty is experienced in maintaining the battery in proper condition, because the relation between the demands on the battery for starting and lighting and the generator operation of the dynamo-electric machine to charge the battery is subject to wide and unpredeterminable variations. For instance, when the automobile is used in cities, it is frequently started and stopped and is often left standing at night with the lights burning, as while the owner is at the theater; under these circumstances the battery is discharging almost continuously, with insufficient charging on account of the short distances driven, most frequently at low speeds. On the other hand, when the automobile is used for cross country travel, for instance, it is often driven at high speed almost continuously during daylight for a number of days, with perhaps but one or two startings of the engine each day, and is not used at all at night time so that the lights are seldom or never used; under these conditions there is a tendency for the battery to be overcharged. Moreover, there is always present a tendency, which can be overcome partially but not entirely, for the dynamo-electric machine to produce a higher voltage at high speeds than at low speeds so that there is danger of charging the battery at too great a rate when the engine is driven at high speed.

It is the object of my present invention to provide a control system which as far as possible shall obviate the aforesaid difficulties. To this end I have provided a control switch which connects the dynamo-electric machine and the battery when the engine speed is between predetermined maximum and minimum limits, and which automatically disconnects them when the engine speed rises above or falls below such limits. This provides for stopping the charging of the battery during the long and fast country runs, when the demands on the battery are light and the voltage produced by the dynamo-electric machine is high, and allows the parts to be so proportioned that the charging of the battery during slower speed runs is generally sufficient. The control switch may be controlled manually for producing the motor operation of the dynamo-electric machine for starting the engine. There may also be provided a device responsive to the current demanded by the lighting system for raising the maximum and lowering the minimum of the aforesaid two limits in accordance with such current, thus providing for increasing the charging of the battery as the demands on it increase.

The accompanying drawings illustrate my invention.

Figure 5:
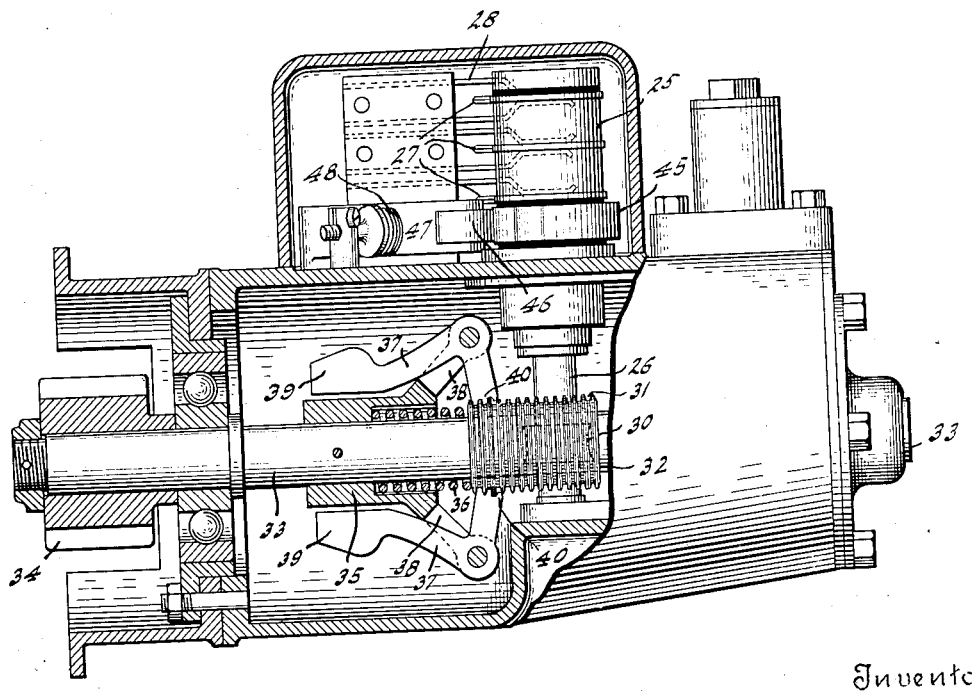

Figure 1 is a plan view of the engine, control switch, and dynamo-electric machine on the front end of the chassis of an automobile equipped with my invention; Fig. 2 is a diagram showing the electrical connections; Fig. 3 is a vertical transverse section through the control switch; Fig. 4 is a plan of the control switch with the cover removed; and Fig. 5 is a vertical longitudinal section through the control switch.

Mounted on the crank-shaft of the internal combustion engine 11 which drives the automobile, or otherwise mechanically connected to such shaft, is the rotating part of a dynamo-electric machine 12, the speed of which is thus proportional to that of the engine. This dynamo electric machine is shown as surrounding the clutch 9 connecting the engine crank-shaft to the transmission shaft 10, as set forth in my co-pending application Ser. No. 733,056 of even filing date herewith. The field magnets of the dynamo-electric machine 12 are provided with series windings 13 and shunt windings 14, which act cumulatively for motor operation and differentially for generator operation. A distributing circuit 15—16, across which lights 17 may be suitably connected, as by a hand switch 18, is supplied by a storage battery 19, which at times supplies current to and at times is suplied with current by the dynamo-electric machine 12.

The connection of the dynamo-electric machine 12, or at least one side thereof, to the battery 19 and the distributing circuit 15—16 is controlled by my improved control switch 25, the other side of the dynamo-electric machine conveniently being permanently connected to the battery and distributing circuit. This control switch comprises a vertical shaft 26 carrying three inter-connected knife blade contacts 27, which coöperate respectively with three pairs of spring contact fingers 28 connected respectively to one side (say 15) of the distributing circuit, to one end of the shunt winding 14, and to one end of the armature and series field circuit of the dynamo-electric machine 12. The knife blades 27 may be moved in either direction from their position in engagement with the spring contacts 28, such contacts being properly bent, as clearly shown in Figs. 4 and 5, to permit this.

On the shaft 26 is mounted a pinion 30 having a concave tooth-face and meshing with this pinion 30 are the ribs 31 of a circumferentially grooved sleeve 32 loose on a horizontal shaft 33. This shaft 33 is provided with a pinion 34 which meshes with a gear wheel on the crank-shaft of the engine 11, so that the speed of the shaft 33 is proportional to that of the engine. A collar 35 is fixed on the shaft 33, and is provided with a pocket around the shaft at the end toward the sliding sleeve 32 to receive a compression spring 36 which tends to push such sleeve to the right (Fig. 5).

A pair of bell-crank levers 37 are pivotally mounted on arms 38 projecting from the collar 35, and are provided on their axially extending arms with weights 39 and on their radially extending arms with gear teeth 40 which mesh with the ribs 31. As the weights 39 fly outward by centrifugal force upon an increase in speed, they move the sleeve 32 to the left (Fig. 5) against the spring 36, and thus turn the pinion 30 and shaft 26 in a clockwise direction (Fig. 4).

Suitably fixed on the shaft 26 is a cam 45, against the periphery of which bears a roller 46 carried by an arm 47. An adjustable spring 48 presses the arm 47 toward the cam 45, and the periphery of such cam is notched where the roller 46 bears when the knife blades 27 engage the contacts 28 and also, if desired, where such roller bears when such knife blades and contacts are out of engagement in a counter-clockwise direction (Fig. 4), which disengagement occurs when the speed of the engine 10 is less than a predetermined minimum. An electro-magnet 49, having its energizing coil connected so that it is responsive to the current taken by the lights 17, as by being in series with one of the supply wires for such lights, may be mounted so that it tends to assist the spring 48 to bias the arm 47 toward the cam 45, the amount of such assistance being proportional to such current. The cam 45 is provided with a finger 50 which may be engaged by a finger 51 carried by a vertical pivot shaft 52 and provided with an operating arm 53 suitably connected by connecting rods 54 to a push-button 55 mounted on the dash board 56 of the automobile and biased by a spring 57 to move the finger 51 away from the finger 50.

In order to start the engine, the push-button 55 is pushed, as by the driver's foot, so that the finger 51 acts on the finger 50 to move the shaft 26 and the control switch 25 in a clockwise direction (Fig. 4) to bring the knife blades 27 into engagement with the contacts 28. This allows current to flow from the battery through the armature and field windings of the dynamo-electric machine 12, and the latter acts as a motor, with the two field windings acting cumulatively, to start the engine. As soon as the engine begins to operate under its own power it picks up in speed and drives the dynamo-electric machine 12 as a generator, whereupon the current through the armature and the series field winding reverses and the series field winding opposes the shunt field winding. The driver may now remove his foot from the push-button 55, as the speed of the engine as soon as it begins to operate under its own power is sufficient to throw out the weights 39 far enough to hold the knife blades 27 in engagement with the contacts 28; upon such removal the spring 57 at once moves the finger 51 out of the path of the finger 50 so that there will be no interference with the speed-control action of the control switch. As the speed of the engine is increased, the weights 39 tend to fly out farther, and thus move the sleeve 32 to the left (Fig. 5) and turn the shaft 26 and the control switch 25 in a clockwise direction (Fig. 4). This tendency is opposed by the action of the spring 36 and of the spring-pressed roller 46 on the notches of the cam 45; but overcomes such opposition when the speed of the engine becomes sufficiently high, say about 30 miles an hour, and becomes effective to move the knife blades 27 out of engagement with the contacts 28 but on the opposite side thereof from their position when the engine was at rest. While the control switch was closed the dynamo-electric machine 12 operated as a generator to charge the battery 19 and supply the lights 17, the series and shunt field windings being so proportioned that by their differential action the increase of generator voltage is but very slight as compared with the increase in speed. While the speed of the automobile remains above the aforesaid 30 miles an hour there is no charging of the battery, but when the speed falls below such value, the control switch closes again, on account of the decrease in centrifugal force acting on the weights 39, and charging of the battery recommences. If the engine speed is decreased below a predetermined minimum, say 10 miles an hour, the spring 36 overcomes the decreased centrifugal force on the weights 39 and pushes the collar 32 to the right (Fig. 5) and the shaft 26 in a counter-clockwise direction (Fig. 4) to open the control switch 25. This opening takes place before the generator voltage decreases below that of the battery. If the lights 17 are being used, the current taken thereby energizes the electro-magnet 49 and increases the pressure of the roller 40 on the periphery of the cam 45. This raises the maximum and lowers the minimum speed at which the control switch opens.

I claim as my invention:

1. In a motor vehicle, the combination of an internal combustion engine, a dynamo-electric machine mechanically connected with the engine, a storage battery, a control switch for connecting the dynamo-electric machine across the battery, manually operated means for closing said switch, and a device responsive to the speed of the engine for causing said switch to open when said engine speed rises above or falls below predetermined maximum and minimum limits.

2. In a motor vehicle, the combination of an internal combustion engine, a dynamo-electric machine mechanically connected with the engine, a storage battery, a control switch for connecting the dynamo-electric machine across the battery, manually operated means for closing said switch, and a device responsive to the speed of the engine for causing said switch to open when said engine speed rises above a predetermined maximum limit.

3. In a motor vehicle, the combination of an internal combustion engine, a dynamo-electric machine mechanically connected with the engine, a storage battery, a control switch for connecting the dynamo-electric machine across the battery, manually operated means for closing said switch, a device responsive to the speed of the engine for causing said switch to open when said engine speed rises above or falls below predetermined maximum and minimum limits, an electric lighting circuit supplied from said battery, and means responsive to the current taken by said lighting circuit for raising said maximum limit and lowering said minimum limit in accordance with the amount of current taken by such lighting circuit.

4. In a motor vehicle, the combination of an internal combustion engine, a dynamo-electric machine mechanically connected with the engine, a storage battery, a control switch for connecting the dynamo-electric machine across the battery, manually operated means for closing said switch, a device responsive to the speed of the engine for causing said switch to open when said engine speed rises above a predetermined maximum limit, an electric lighting circuit supplied from said battery, and means responsive to the current taken by said lighting circuit for raising said maximum limit in accordance with the amount of current taken by such lighting circuit.

5. In a motor vehicle, the combination of an internal combustion engine, a dynamo-electric machine mechanically connected with the engine, a storage battery, a control switch for connecting the dynamo-electric machine across the battery, said control switch having an "on" position and an "off" position on each side of such "on" position, manually operated means for closing said switch from one of said "off" positions, and a device responsive to the speed of the engine for causing said switch to open to the other "off" position when said engine speed rises above a predetermined maximum limit and to the first "off" position when said engine speed falls below a predetermined minimum limit.

6. In a motor vehicle, the combination of an internal combustion engine, a dynamo-electric machine mechanically connected with the engine, a storage battery, a control switch for connecting the dynamo-electric machine across the battery, said control switch having an "on" position and an "off" position on each side of such "on" position, manually operated means for closing said switch from one of said "off" positions, and a device responsive to the speed of the engine for causing said switch to open to the other "off" position when said engine speed rises above a predetermined maximum limit.

7. In combination, a prime mover, a dynamo-electric machine mechanically connected to said prime mover, a storage battery, a lighting circuit supplied from said battery, a control switch for connecting said dynamo-electric machine across said battery, means responsive to the speed of the prime mover for opening said control switch upon a predetermined minimum speed of the engine, and means for varying said predetermined speed in accordance with the current taken by said lighting circuit.

8. In combination, a prime mover, a dynamo-electric machine mechanically connected to said engine, a storage battery, a lighting circuit supplied from said battery, a control switch for connecting said dynamo-electric machine across said battery, means responsive to the speed of the prime mover for opening said control switch when such speed exceeds a predetermined value, and means for varying said speed value in accordance with the current taken by said lighting circuit.

9. In a motor vehicle, the combination of an internal combustion engine, a dynamo-electric machine mechanically connected to said engine, a storage battery, a control switch for connecting said dynamo-electric machine to said storage battery, a centrifugal governor responsive to the engine speed and controlling the position of said switch to hold the switch closed when the engine speed is within predetermined limits, and manually operated means for closing said control switch independently of the centrifugal governor when the engine speed does not exceed the predetermined minimum.

10. In a motor vehicle, the combination of an internal combustion engine, a dynamo-electric machine mechanically connected to said engine, a storage battery, a control switch for connecting said dynamo-electric machine to said storage battery, a centrifugal governor responsive to the engine speed and controlling the position of said switch to hold the switch closed when the engine speed is within predetermined limits, and manually operated means for closing said control switch independently of the centrifugal governor.

11. In a motor vehicle, the combination of an internal combustion engine, a dynamo-electric machine mechanically connected to said engine, a storage battery, a control switch for connecting said dynamo-electric machine to said storage battery, a centrifugal governor responsive to the engine speed and controlling the position of said switch to hold the switch closed when the engine speed is within predetermined limits, manually operated means for closing said control switch independently of the centrifugal governor when the engine speed does not exceed the predetermined minimum, a consumption circuit which may be connected to said storage battery, and means responsive to the current taken by said consumption circuit for varying the speed limits between which the centrifugal governor holds the control switch closed.

12. In combination, a variable speed dynamo-electric machine, a storage battery, a lighting circuit supplied from said battery, a control switch for connecting said dynamo-electric machine to said battery, means responsive to the speed of the dynamo-electric machine for opening said control switch when such speed exceeds a predetermined value, and means for varying the speed limit at which said switch is opened in accordance with the current taken by said lighting circuit.

13. In combination, a variable speed compound-wound dynamo-electric machine, a storage battery, a lighting circuit supplied from said battery, a control switch for connecting said dynamo-electric machine to and completely disconnecting it from said battery, and means responsive to the speed of the dynamo-electric machine for opening said control switch when such speed exceeds a predetermined value.

14. In combination, a prime mover, a dynamo-electric machine mechanically connected with the prime mover, a storage battery, a control switch which when closed connects the dynamo-electric machine and the storage battery and when open completely disconnects said dynamo-electric machine from the storage battery, and means responsive to the speed of the prime mover for closing said control switch when said speed is between certain predetermined limits and for opening said control switch when such speed either rises above or falls below such limits.

15. In combination, a prime mover, a dynamo-electric machine mechanically connected with the prime mover, a storage battery, a unitary control switch having an intermediate closed position and two extreme open positions, said control switch when in closed position connecting the storage battery and the dynamo-electric machine, and means responsive to the speed of the prime mover for closing said switch for intermediate values of such speed and for opening said switch to one or the other of its open positions according as such speed rises above or falls below certain predetermined limits for said intermediate speed.

16. In a motor vehicle, the combination of an internal combustion engine, a dynamo-electric machine mechanically connected with the engine, a storage battery, a control switch for connecting the dynamo-electric machine across the battery, manually operated means for closing said switch, and a device responsive to the speed of the engine for causing said switch to open when said engine speed rises above or falls below predetermined maximum and minimum limits, said manually operated means being biased to a position in which it does not interfere with the speed-controlled action of the control switch.

17. In a motor vehicle, the combination of an internal combustion engine, a dynamo-electric machine mechanically connected with the engine, a storage battery, a control switch for connecting the dynamo-electric machine across the battery, manually operated means for closing said switch, and a device responsive to the speed of the engine for causing said switch to open when said engine speed rises above a predetermined maximum limit, said manually operated means being biased to a position in which it does not interfere with the speed-controlled action of the control switch.

18. In combination, a variable speed dynamo-electric machine, a storage battery, a control switch for connecting the dynamo-electric machine across the battery, a device responsive to the speed of the dynamo-electric machine for causing said switch to open when said speed rises above or falls below predetermined maximum and minimum limits, an electric light circuit supplied from said battery, and means responsive to the current taken by said lighting circuit for raising said maximum limit and lowering said minimum limit upon an increase in the current taken by said lighting circuit.

19. In combination, a variable speed dynamo-electric machine, a storage battery, a control switch for connecting the dynamo-electric machine across the battery, a device responsive to the speed of the dynamo-electric machine for causing said switch to open when said speed falls below a predetermined minimum limit, an electric light circuit supplied from said battery, and means responsive to the current taken by said lighting circuit for lowering said minimum limit upon an increase in the current taken by said lighting circuit.

20. In combination, a variable speed dynamo-electric machine, a storage battery, a control switch for connecting the dynamo-electric machine across the battery, a device responsive to the speed of the dynamo-electric machine for causing said switch to open when said speed rises above a predetermined maximum limit, an electric light circuit supplied from said battery, and means responsive to the current taken by said lighting circuit for raising said maximum limit upon an increase in the current taken by said lighting circuit.

21. In combination, a variable speed dynamo-electric machine, a storage battery, a control switch for connecting the dynamo-electric machine across the battery, said control switch having an "on" position and an "off" position on each side of such "on" position, and a device responsive to the speed of the engine for causing said switch to open to the two "off" positions when the speed of said dynamo-electric machine rises above and falls below predetermined maximum and minimum limits respectively.

22. In combination, a variable speed dynamo-electric machine, a storage battery, a control switch for connecting said dynamo-electric machine to said storage battery and for completely disconnecting said dynamo-electric machine from said storage battery, a centrifugal governor responsive to the speed of the dynamo-electric machine and controlling the position of said switch to hold the switch closed when the engine speed is within predetermined limits.

23. In combination, a variable speed dynamo-electric machine, a storage battery, a control switch for connecting said dynamo-electric machine to said storage battery, a centrifugal governor responsive to the speed of the dynamo-electric machine and controlling the position of the switch to hold the switch closed when such speed is within predetermined limits, a consumption circuit which may be connected to said storage battery, and means responsive to the current taken by said consumption circuit for varying the speed limits between which the centrifugal governor holds the control switch closed.

24. In a motor vehicle, the combination of an internal combustion engine, a dynamo-electric machine mechanically connected with the engine, a storage battery, a control switch for connecting the dynamo-eleceric machine across the battery, manually operated means for closing said switch, and a device responsive to the speed of the engine for causing said switch to open when such engine speed falls below a predetermined minimum limit, said manually operated means being biased to a position in which it does not interfere with a speed-controlled action of the control switch.

25. In combination, a prime mover, a dynamo-electric machine mechanically connected to said prime mover, a storage battery, a lighting circuit supplied from said battery, a control switch for connecting said dynamo-electric machine across said battery, means responsive to the speed of the prime mover for opening said control switch upon a predetermined maximum speed and also upon a predetermined minimum speed of the engine, and means for varying said predetermined maximum and minimum speeds in accordance with the current taken by said lighting circuit.

In witness whereof, I have hereunto set my hand and seal at Indianapolis, Indiana, this 21st day of November, A. D. one thousand nine hundred and twelve.

ROBERT H. HASSLER. [L. S.]

Witnesses:
ARTHUR M. HOOD,
FRANK A. FAHLE.